US007031460B1

(12) United States Patent
Zheng et al.

(10) Patent No.: US 7,031,460 B1
(45) Date of Patent: Apr. 18, 2006

(54) TELEPHONIC HANDSET EMPLOYING FEED-FORWARD NOISE CANCELLATION

(75) Inventors: Dunmin Zheng, Vienna, VA (US); Michael Anthony Zuniga, Fairfax, VA (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/170,835

(22) Filed: Oct. 13, 1998

(51) Int. Cl.
*H04M 1/00* (2006.01)

(52) U.S. Cl. ............................... 379/406.06; 381/71.1; 381/71.13; 381/94.1

(58) Field of Classification Search ........... 379/406.01, 379/406.08, 406.06; 381/71.1, 71.6, 94.7, 381/71.5, 71.7, 71.13, 71.11, 71.3, 94.1; 708/322
See application file for complete search history.

(56) References Cited

U.S. PATENT DOCUMENTS 5,138,664 A * 8/1992 Kimura et al. ........... 381/71.13
5,491,747 A 2/1996 Bartlett et al.
6,078,672 A * 6/2000 Saunders et al. .......... 381/71.6
6,256,383 B1 * 7/2001 Chen .......................... 370/291
6,418,227 B1 * 7/2002 Kuo .......................... 381/71.5

OTHER PUBLICATIONS

Nelson, P.A. et al. "Single Channel Feedforward Control", *Active Control of Sound*, pp. 161-203, (1992).
Widrow, B. et al. *Adaptive Signal Processing*, prentice Hall, 1985.
U.S. Appl. No. 09/055,481, filed Apr. 6, 1998.

* cited by examiner

*Primary Examiner*—Jefferey F. Harold
(74) *Attorney, Agent, or Firm*—M. I. Finston

(57) ABSTRACT

A telephonic handset comprises an active noise reduction (ANR) system. The ANR system comprises a reference microphone and an IIR filter. The IIR filter is receivingly coupled to the reference microphone with respect to noise reference signals, and it is transmittingly coupled to the receiver transducing element of the handset. The ANR system is configured as a fixed feed-forward noise cancellation system. Preferably, the IIR filter has a transfer function derived, in part, from the open-loop gain of a feedback noise cancellation system.

In specific embodiments of the invention, the noise reference microphone is situated so as to sample the ambient noise field near the front face of the receiver, but without directly sampling the noise field on the front face.

19 Claims, 4 Drawing Sheets

TELEPHONIC HANDSET EMPLOYING FEED-FORWARD NOISE CANCELLATION

FIELD OF THE INVENTION

This invention relates to noise-canceling telephonic handsets, and more specifically to those that employ feed-forward cancellation techniques.

ART BACKGROUND

The utility of telephonic handsets, such as cellular terminals and cordless telephones, in noisy environments is limited by the interfering noise that is passed to the user's ear. To improve the intelligibility of arriving far-end speech in such environments, handsets of the prior art have incorporated such expedients as a volume control to increase the incoming sound signal level relative to the noise signal level.

Another expedient is active cancellation of the ambient acoustic noise pressure relative to the incoming speech acoustic pressure within the user's ear. One approach to active noise cancellation is described, for example, in U.S. Pat. No. 5,491,747, issued on Feb. 13, 1996 to C. S. Bartlett et al. under the title "Noise-Cancelling Telephone Handset", and commonly assigned herewith.

In typical applications of active noise cancellation, a microphone picks up the ambient noise pressure and generate a signal that is fed into a noise canceling circuit. This circuit creates a noise inverted signal that is applied to the handset receiver. (In this context, the "receiver" is a loudspeaker or other electric-to-acoustic transducer for projecting the received audio signal into the user's ear.) The receiver acoustic output subtractively interferes with the ambient noise pressure, thus reducing the noise level in the user's ear.

It is well known that active noise canceling techniques may be either of a negative feedback design or a feed-forward design. Both of these approaches are described, for example, in P. A. Nelson and S. J. Elliot, *Active Control of Sound*, Academic Press, 1992. Although the viability of feed-forward designs has been recognized, negative feedback designs have generally been preferred for use in telephonic equipment, such as in headset earpieces. Such a preference is due, in part, to the greater robustness that negative-feedback designs tend to exhibit against inter-user variability. This preference is also due, in part, to the relative ease with which these designs may be implemented in analog circuitry, and to a general perception that feed-forward designs provide an inferior level of noise cancellation. An illustrative negative feedback system of the prior art is shown in FIG. 1.

There has also been a general perception that a feed-forward design can be made robust against inter-user variability only by incorporating adaptive circuitry. However, as a practical matter, such an expedient would call for a digital signal processor (DSP) having two analog-to-digital converters (ADCs)—one each for the reference microphone and the error microphone, respectively, and one digital to analog converter (DAC) to generate the canceling noise signal for the handset receiver. Although recent digital cellular terminals do in fact include a DSP, the requisite number of ADCs is not generally present. Additionally, the computational capacity of the terminal DSP is substantially taken up by the other voice processing functions required by the terminal. Thus, very little computational capacity is left over for implementation of an active noise canceling function. Although there are commercially available some DSPs that have been designed specifically for active noise cancellation, the computational capacity of even these devices is limited as a result of pressure to keep the cost within bounds of commercial feasibility.

Despite their reputed advantages, negative feedback noise canceling designs suffer from certain disadvantages as well. For example, to avoid a potential instability, it is generally desirable to set the feedback gain to a level that is lower than optimum, leading to some performance degradation.

This and other disadvantages could be overcome by a computationally efficient feed-forward noise cancellation design suitable for implementation on a DSP.

SUMMARY OF THE INVENTION

We have provided such a design. Our design is a fixed feed-forward design that can perform effective noise cancellation and that is robust against inter-user variability. Because our design is fixed, and not adaptive, the DSP does not suffer the burden of adding an adaptive filter to the DSP software. Moreover, although a noise reference microphone is required, there is no need to include an error microphone. Consequently, parts costs and assembly costs can be reduced relative to adaptive designs.

Significantly, we have discovered that human behavior is a natural ally in the quest to reduce inter-user variability. That is, the user of a fixed (i.e., non-adaptive) feed-forward noise canceling handset tends to instinctively position the earpiece of the handset on the ear so that noise cancellation performance is maximized. It is a matter of common experience that the human brain is adept at tuning a radio dial to maximize the signal-to-noise ratio of sensory input. Our discovery shows that the brain can also provide the adaptivity required to make a fixed feed-forward system not only feasible, but also highly effective and robust.

The co-pending U.S. patent application Ser. No. 09/055,481, filed on Apr. 6, 1998 by C. S. Bartlett et al. under the title "Telephonic Handset Apparatus Having an Earpiece Monitor and Reduced Inter-User Variability" and commonly assigned herewith, describes a physical handset arrangement that reduces inter-user variability. The present invention has utility independent of such handset arrangement and need not be used conjointly with it. However, these approaches are at least partly complementary, and their combined use is especially advantageous.

In one aspect, our invention involves a telephonic handset, such as a mobile wireless terminal, that comprises an active noise reduction (ANR) system. The ANR system comprises a reference microphone and an IIR filter. The IIR filter is receivingly coupled to the reference microphone with respect to noise reference signals, and it is transmittingly coupled to the receiver transducing element of the handset. The ANR system is configured as a fixed feed-forward noise cancellation system.

In preferred embodiments of the invention, the IIR filter has a transfer function derived, in part, from the open-loop gain of a feedback noise cancellation system.

In specific embodiments of the invention, the noise reference microphone is situated so as to sample the ambient noise field near the front face of the receiver, but without directly sampling the noise field on the front face. Thus, in exemplary embodiments, the port of the reference microphone opens onto a side-facing or rear-facing external surface of the handset. In this context, the front-facing direction is the direction facing toward the user's ear.

DETAILED DESCRIPTION

Figure 2A:
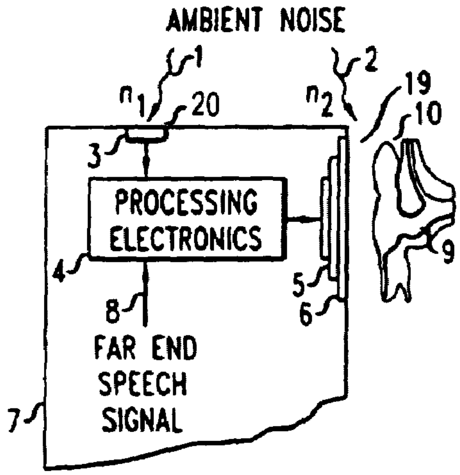
FIGS. 2A and 2B are partially schematic, cross-sectional diagrams of illustrative fixed feed-forward ANR designs installed within a mobile wireless terminal, having two respective, exemplary placements for the noise reference microphone.
Figure 2B:
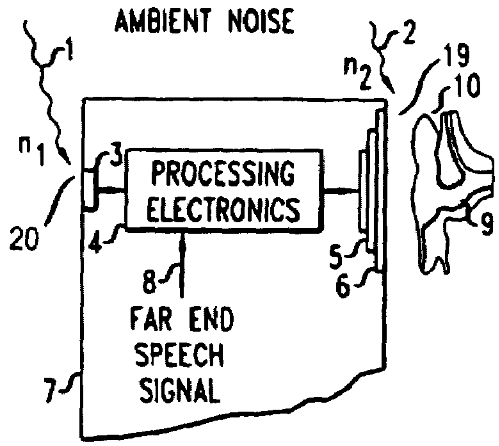

Turning to FIGS. 2A and 2B, an illustrative feed-forward noise canceling system according to the present invention includes an electronic processing module 4, receivingly connected to noise reference microphone 3, and transmittingly connected to receiver 5. Module 4 is also in receiving relationship to far-end signal path 8. Each of the respective FIGS. 2A and 2B depicts an alternative arrangement in which the noise-canceling system is installed within a telephonic handset 7 (exemplarily, a wireless mobile terminal), and the handset positioned near a user's ear-canal opening 9. In FIG. 2A, microphone 3 is situated at a side face of the handset. In FIG. 2B, microphone 3 is situated at a rear face. (In this context, the "front" face is the face directed toward the user's ear when the handset is in use.) It should be understood that various other placements for the reference microphone will also be acceptable. General principles for the advantageous placement of this microphone are set out below.

The operation of a feed-forward noise canceling systems in general has been described in well-known references such as the above-cited book by Nelson and Elliot. Briefly, noise reference microphone 3 senses ambient noise 1 and, in response, generates a signal to be acted upon by electronics module 4. Module 4 generates a noise canceling signal according to well-known principles. The noise canceling signal is fed to receiver 5. The acoustic output of receiver 5 subtractively interferes with ambient acoustic noise 2 within the user's ear canal opening 9. As a result, at least a portion of the ambient noise is canceled.

Receiver 5 may be mounted upon a compact electro-acoustic module 6, as described in co-pending patent application Ser. No. 09/055,481, cited above. Such a module 6 is designed to reduce inter-user variations produced by the variable leak, 19, between the earpiece of the handset and the user's ear. The processing electronics function of module 4, required to achieve feed-forward noise cancellation, is preferably implemented by a digital signal processor (DSP), although other components, such as analog components, may also be used for such implementation.

Figure 3A:
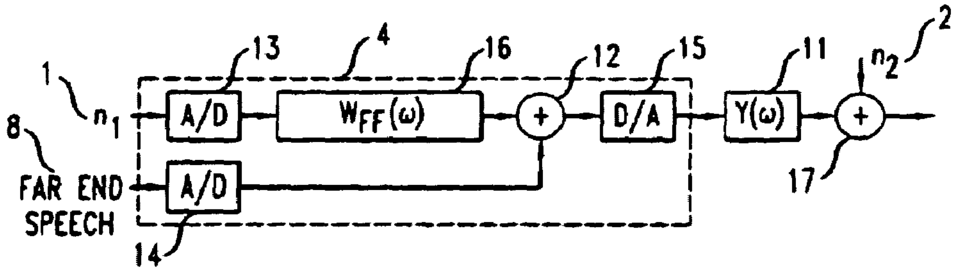
FIGS. 3A and 3B are schematic block diagrams of a feed-forward noise cancellation system, showing, respectively, digital and analog summation of the far-end speech signal.
Figure 3B:
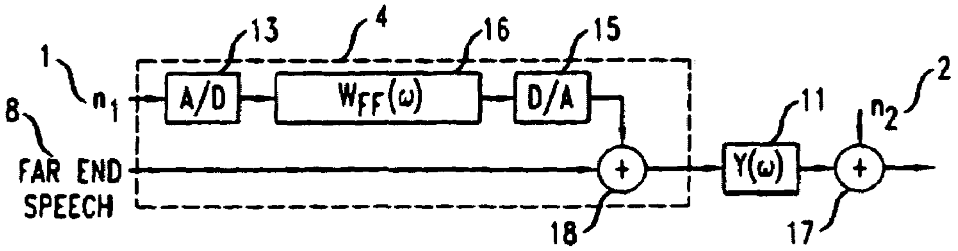

For analytical purposes, a feed-forward noise canceling system is conveniently represented by a system block diagram in which a frequency-domain transfer function represents the operation of each component upon signals. FIGS. 3A and 3B are system block diagrams that represent alternate DSP implementations of a feed-forward noise canceling system.

With reference to FIGS. 3A and 3B, receiver 5 is there represented by transfer function Y(ω) (block 11), which is a ratio obtained by taking the acoustic pressure output into the ear at point 9 of FIGS. 2A and 2B (as it would be measured by a small microphone), and dividing it by the input signal fed to receiver 5. Similarly, the ratio of the output signal to the input signal of processing electronics module 4 may be represented as transfer function $W_{FF}(\omega)$. The feed-forward design is referred to as "fixed" when this transfer function $W_{FF}(\omega)$ is constant over time.

As a practical matter, the respective transfer functions of ADC 13 for the noise reference signal, ADC 14 for the far-end speech input signal, and DAC 15 for the output to the receiver, may generally be approximated as unity.

In FIG. 3A, the far-end speech signal, received on path 8, is digitized by ADC 14 and added digitally (i.e., as data under control of the DSP software) at summing point 12 to the digital input stream to DAC 15. At the summing point, the far-end signal is added to the noise reference signal, which has been processed in accordance with transfer function $W_{FF}(\omega)$.

By contrast, in FIG. 3B, the far-end signal is added, as an analog signal, at summing point 18, which follows DAC 15.

The arrangement of FIG. 3A calls for a DSP having two ADCs, whereas the arrangement of FIG. 3B does not require the DSP to have more than one ADC.

The noise cancellation performance of a feed-forward system is well known to depend upon the coherence (which is preferably as close to unity as possible) between the ambient noise 1 picked up by noise reference microphone 3, and the ambient noise 2 at the point where noise cancellation is desired. (This is discussed, e.g., by the above-cited book by Nelson and Elliot at page 177.) In the case of a telephone handset such as a cellular terminal, the desired point of noise cancellation is the user's ear canal opening 9.

Figure 4:
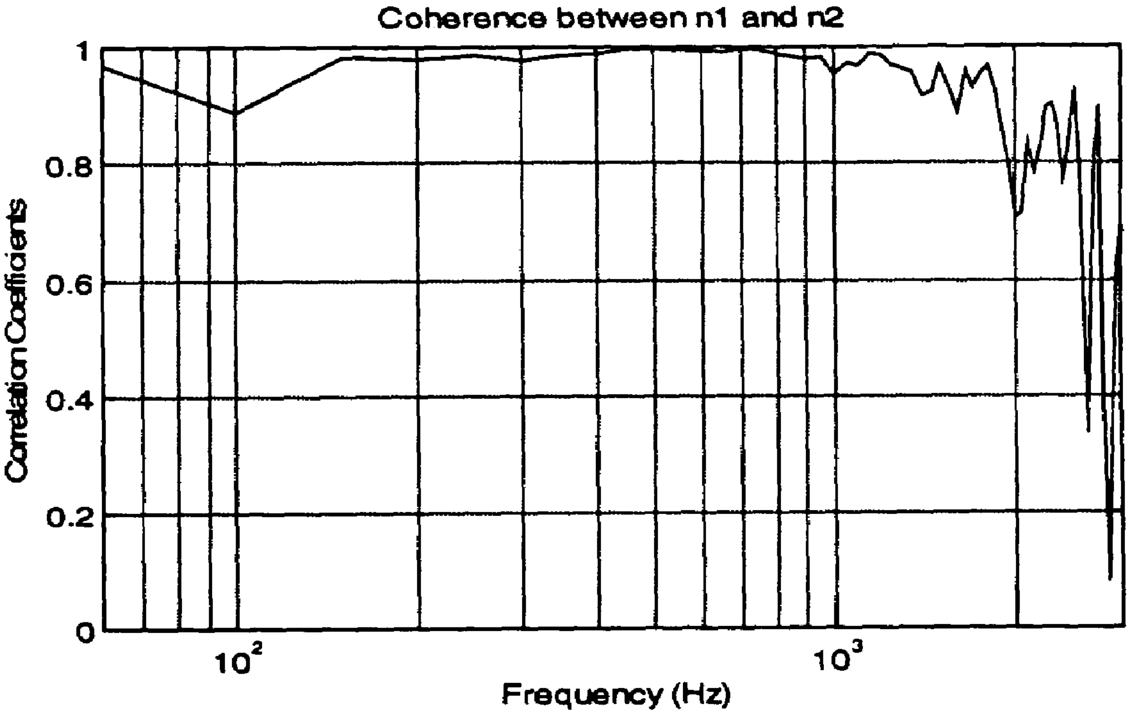
FIG. 4 is a plot, from experimental data, of the coherence (as a function of frequency) between the noise field at a reference microphone within a telephone handset and the noise field within the opening to the user's ear canal.

We performed coherence measurements in a diffuse ambient noise field, using an arrangement such as that of FIG. 2B, in which reference microphone 3 is situated on the rear face of the handset. Ambient noise 2 was measured at point 9 using a small electret microphone. The results of these measurements are shown in FIG. 4.

It is evident from the figure that the coherence is approximately unity over a frequency range up to about 1 kHz. This supports our belief that effective feed-forward noise cancellation is attainable, on a telephone handset, at least up to 1 or 2 kHz. Because the measured coherence begins to fall off at frequencies above about 1 kHz, and falls off both more irregularly and, on the average, more rapidly above about 2 kHz, we would expect the best performance to be obtained at frequencies below 2 kHz.

We also measured the coherence between ambient noise 2 at the user's ear canal opening 9, and ambient noise 1 at the reference microphone. We found that this coherence tends to decrease, over all frequencies, as the separation between microphone 3 and measurement point 9 is increased. This result militates for situating noise reference microphone 3 in such a way that its port 20 samples the ambient noise field as close as is practicable to the front face of the receiver.

However, port 20 should not sample the noise field directly at the front face of the receiver. This is undesirable because it can result in the microphone picking up a substantial amount of acoustic output from receiver 5. This can cause the noise-cancellation performance to degrade, and in the worst cases, it can lead to an unstable feedback loop which may cause audible oscillations. We would consider the amount of feedback to be "substantial" if perceptible degradation in performance occurred. (It should be noted in this regard that the feed-forward system can generally tolerate a small amount of feedback, but feedback in such a system is not provided intentionally, because it does not help performance, and generally tends to degrade it.)

Thus, depending upon the space available inside the handset, microphone 3 will typically be mounted on the inner surface of a side or rear wall of the handset housing; i.e., a wall whose outer surface faces sideward or rearward. Thus, the microphone port will open through such a side or rear wall.

The maximum acceptable effective separation between the receiver element and the sampling point for ambient noise (i.e., port 20) depends upon the desired degree of noise cancellation. As a general rule, this separation is preferably no more than about 3.8 cm, and even more preferably, no more than about 2.5 cm. In this context, the "effective" separation is the distance between port 20 and point 9; i.e., the point at the entrance to the user's ear canal that lies just in front of the receiver element when the handset is in use.

With reference to FIGS. 3A and 3B, we now consider the residual acoustic noise pressure $\epsilon$ at point 9, in the user's ear canal opening, due to noise field 2 having acoustic pressure $n_2$, and noise field 1, having acoustic pressure $n_1$. If there is no far-end speech signal, this residual acoustic pressure is given by:

$$\epsilon = n_2 - Y(\omega) W_{FF}(\omega) n_1. \tag{1}$$

If the noise fields having respective acoustic pressures $n_1$ and $n_2$ are highly coherent, then $n_2$ must be related to $n_1$ by a transfer function F(ω). Then, equation (1) may be rewritten as $$\epsilon = [F(\omega) - Y(\omega) W_{FF}(\omega)] n_1. \tag{2}$$

In order to reduce the residual acoustic noise pressure $\epsilon$ at point 9 to zero, the optimal feed-forward filter $W_{FFOPT}(\omega)$, implemented in the DSP, ideally should satisfy $$W_{FFOPT}(\omega) = F(\omega)/Y(\omega). \tag{3}$$

If the phase slope (or time delay) of Y(ω) were significantly greater than that of F(ω), then the feed-forward filter, $W_{FFOPT}(\omega)$, would need to be anti-causal to achieve noise cancellation. As a general rule, this cannot be achieved in practice. Therefore, for there to be effective feed-forward noise cancellation, it is desirable to select receiver 5 to have minimal time delay (or phase slope) over as broad a frequency band as possible. Because, as a practical matter, this cannot be perfectly achieved, some compromise in noise cancellation performance must be expected.

Figure 5:
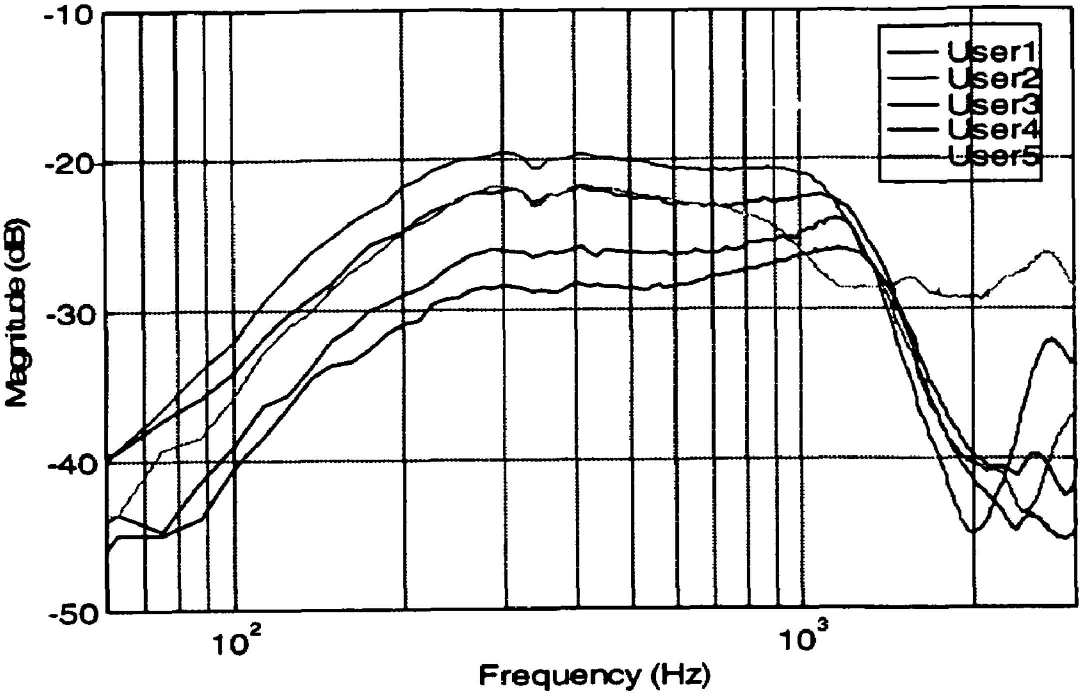
FIG. 5. is a graph, versus frequency, of the transfer function Y(ω), which represents the ratio of acoustic pressure output by the receiver of a telephonic handset to the electrical input. Plotted on the graph is this transfer function, for five distinct users.

Moreover, as discussed earlier, transfer functions F(ω) and Y(ω) will generally vary from user to user because of the variable leak 19. FIG. 5 illustrates the inter-user variability in Y(ω) for 5 different users of an exemplary handset. Because of this variability, the optimal fixed feed-forward filter $W_{FFOPT}(\omega)$ for one individual's ear will not be the correct optimal filter for another individual's ear, and for such second individual, noise-cancellation performance will be degraded.

Figure 6:
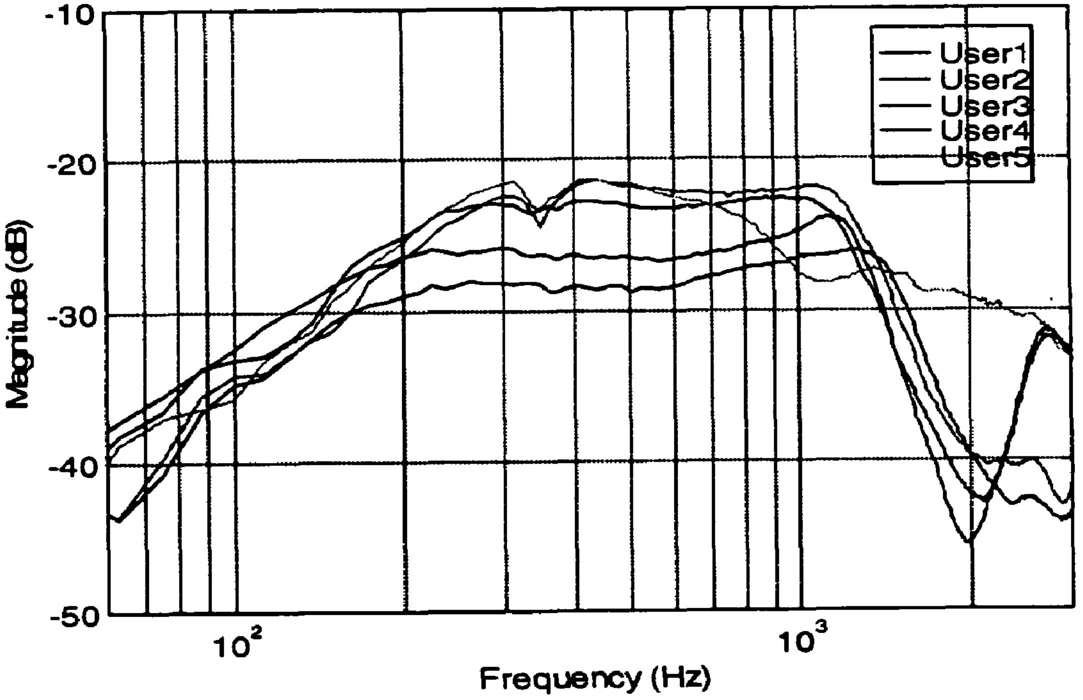
FIG. 6. is a graph, similar to the graph of FIG. 5, but representing the case in which a prior-art technique of electro-acoustic modification is applied in the handset.

In co-pending patent application Ser. No. 09/055,481, cited above, there is described an electro-acoustic module, for mounting receiver 5, that is adapted to substantially reduce the inter-user variability in transfer functions Y(ω) and F(ω). In such an electro-acoustic module, a small fixed leak is introduced in parallel with the variable leak, 19. In effect, the fixed leak "shorts out" the variable leak, thus making the total leak appear almost constant. The reduced variability in Y(ω) for the same five users of FIG. 5 is shown in FIG. 6.

Although this result contributes significantly to the effectiveness of fixed feed-forward noise cancellation designs, it fails to provide the correct optimal fixed filter, $W_{FFOPT}(\omega)$, that should be used for a broad range of users.

A practical such filter $W_{FFOPT}(\omega)$, for a broad range of users, is advantageously obtained by minimizing the residual pressure given by equation 3 over a range of users. The result gives an optimal averaged fixed feed-forward filter, $\langle W_{FFOPT}(\omega)\rangle$, according to:

$$\langle W_{FFOPT}(\omega)\rangle = \langle F(\omega)\rangle / \langle Y(\omega)\rangle, \tag{4}$$

where the angular brackets indicate an average over several users.

In principle, the optimal feed-forward filter may be implemented by Fourier transforming $W_{FFOPT}(\omega)$, as given by equation (3), into the time domain and then embodying the result in software as a digital finite-duration impulse response (FIR) filter. A theoretical understanding of such a procedure may be obtained, e.g., from the above-cited book by Nelson and Elliot at pages 180–181.

Alternatively, direct time-domain methods, such as the filtered-x LMS algorithm (described, e.g., in the above-cited book at page 196) can be used to derive the coefficients of the optimal fixed feed-forward FIR filter to minimize the residual pressure, $\epsilon$.

In both cases, however, if the number of FIR filter coefficients is large, then the computational load on the DSP may be unacceptably large. Furthermore, there is a need in both cases to ensure that the optimal fixed feed-forward FIR filter does not significantly amplify the ambient noise outside of the frequency range of design. Still further, when these conventional techniques are used, there is no way to specify, a priori, the level of noise cancellation performance, even in an average sense.

We have discovered that these disadvantages can be overcome by implementing our feed-forward filter design in an infinite-duration impulse response (IIR) filter, and not in a FIR filter.

Those skilled in the art will appreciate that both FIR filters and IIR filters are defined by sets of filter coefficients. Well-known algorithms, such as the least mean square (LMS) algorithms, are available for setting the values of these coefficients to achieve some desired performance. (In the case of LMS algorithms, the coefficients are adjusted so as to minimize an error function such as the squared modulus of the residual noise, integrated over a frequency range.)

The mathematical description of a FIR filter is related in a directly intuitive way to a delay line having weighted taps, and a summing element for combining the tapped outputs in accordance with their respective weights, given by the filter coefficients. As a general rule, the coefficients of such a system are readily determined using standard algorithms.

The mathematical description of an IIR filter is most concisely expressed by the system function of the filter. The system function is a complex-valued function of a complex value. The system function is defined by the locations of its poles and zeroes in the complex plane. The filter coefficients are related to these poles and zeroes. As a general rule, the coefficients of an IIR filter are more difficult to determine using standard algorithms, relative to FIR filter coefficients. However, if an IIR filter is achievable, it can often perform using substantially fewer coefficients, and with substantially greater computational efficiency, than a comparably performing FIR filter.

In fact, we could not directly implement our optimal fixed filter, $W_{FFOPT}(\omega)$, in an IIR filter. Because of the erratic behavior of $F(\omega)$ above 1 kHz, and especially above 2 kHz, $W_{FFOPT}(\omega)$ would be too poorly defined to provide a stable filter even up to 1 kHz. Moreover, direct implementation of this function could call for the filter to operate non-causally, which is not achievable. Significantly, our attempts at direct implementation using standard algorithms failed to converge within reasonable lengths of time.

We overcame these problems by finding an appropriate weighting function, and multiplying $W_{FFOPT}(\omega)$ by this weighting function to obtain a new feed-forward filter function $\tilde{W}_{FF}(\omega)$. The weighting function is designed to roll off at high frequencies, such as frequencies above 1 kHz. As a result, the erratic, high-frequency portion of so the bad part of $F(\omega)$ may be set to a well-behaved proxy such as a constant, unit-valued function. Moreover, we found that $\tilde{W}_{FF}(\omega)$ can be made to closely approximate $W_{FFOPT}(\omega)$ at frequencies up to 1 kHz, or even up to 2 kHz. When an LMS algorithm was used to implement $\tilde{W}_{FF}(\omega)$ in an IIR filter, we found that the solution converged readily.

The weighting function is defined in terms of the solution to the feedback noise cancellation problem for the same telephonic handset. Let $W_{FB}(\omega)$ be the transfer function of the negative feedback filter that solves this problem. Let $Y(\omega)$, as before, be the transfer function of the receiver. Then $G(\omega)=Y(\omega)W_{FB}(\omega)$ is the open loop gain of the feedback noise cancellation system. Our weighting function is $$\frac{G(\omega)}{1+G(\omega)}.$$

Thus, $$\tilde{W}_{FF}(\omega)=\frac{G(\omega)}{1+G(\omega)}W_{FF_{OPT}}(\omega).$$

As explained above, $W_{FFOPT}(\omega)$ is based on averaged values of $F(\omega)$ and $Y(\omega)$. This is particularly advantageous because the averaged values define the center of an operating range for the positioning of the handset when it is in use. This maximizes the likelihood that a given user will find a personal optimum position for the handset when using it.

Those skilled in the art will appreciate that there is some flexibility in solving the feedback noise cancellation problem. Thus, it will generally be the case that an open loop gain $G(\omega)$ can be devised that not only provides a feasible solution to the feedback problem, but also tends to be relatively large at speech-band frequencies below 1 or 2 kHz, and tends to roll off above 1 or 2 kHz. Such an open loop gain will provide a weighting function for the feed-forward system that is near unity in the frequency range of interest, and rolls off above that range.

We now provide details of our new algorithmic approach, in which a weighted, feed-forward transfer function is implemented in an IIR filter.

Figure 1:
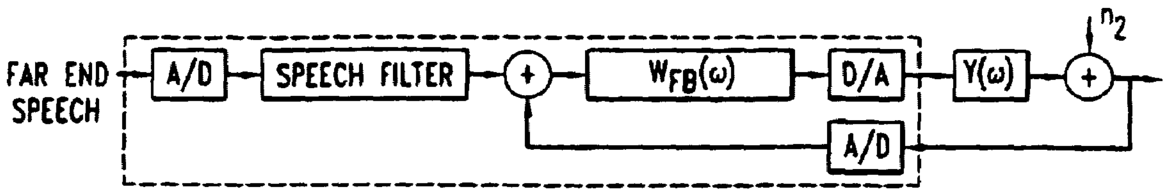
FIG. 1 is a schematic representation of a negative feedback active noise reduction (ANR) design of the prior art.

In this regard, reference is usefully made to the classic negative feedback noise cancellation system of FIG. 1. In such a system, the residual pressure $\epsilon$ in the ear is well known to be given by:

$$=n_2/[1+Y(\omega)W_{FB}(\omega)]=n_2/[1+G(\omega)] \qquad (5)$$

where $G(\omega)=Y(\omega)W_{FB}(\omega)$ is the open loop gain, and $W_{FB}(\omega)$ is the negative feedback filter, which is to be designed to stably minimize the residual pressure given by equation (5).

Equation (5) may be recast into the following form:

$$\epsilon=n_2-G(\omega)\epsilon. \qquad (6)$$

Substituting equation (5) into the right hand side of equation (6) yields:

$$\epsilon=n_2-n_2G(\omega)/[1+G(\omega)] \qquad (7)$$

Reference is made to feed-forward behavior by here introducing the transfer function $F(\omega)$ which, as explained earlier, relates the noise acoustic pressure $n_2$ to the noise acoustic pressure $n_1$. This permits equation (7) to be rewritten in the following form, which reveals a feed-forward structure:

$$\epsilon=n_2-\{F(\omega)G(\omega)/[1+G(\epsilon)]\}n_1. \qquad (8)$$

Comparison of equation (8) with equation (1) (i.e., $\epsilon=n_2-Y(\omega)W_{FF}(\omega)n_1$) reveals that the fixed feed-forward filter $\tilde{W}_{FF}(\omega)$ for a fixed feed-forward noise canceling system may be obtained from the open loop gain $G(\omega)$ of a feedback noise cancellation system, the noise transfer function $F(\omega)$, and the receiver transfer function $Y(\omega)$. That is:

$$\tilde{W}_{FF}(\omega)=[F(\omega)/Y(\omega)]\{G(\omega)/[1+G(\omega)]\}. \qquad (9)$$

Significantly, the expression for $\tilde{W}_{FF}(\omega)$ in equation (9) consists of two factors, $F(\omega)/Y(\omega)$ and $G(\omega)/[1+G(\omega)]$. As $G(\omega)$ becomes very large, $\tilde{W}_{FF}(\omega)$ approaches $W_{FFOPT}(\omega)=F(\omega)/Y(\omega)$, the optimal fixed feed-forward filter required to reduce the residual pressure in a user's ear. Consequently, the optimal fixed feed-forward filter for a given frequency band is easily realized using classical feedback design techniques in which $G(\omega)$ is made as large as possible over the desired frequency band, and then rolled off in magnitude outside of that frequency band to ensure stability. As noted, the ratio of user averaged values, $\langle F(\omega)\rangle/\langle Y(\omega)\rangle$, is advantageously used in equation (9).

An alternate interpretation of equation (9) is that the product of $F(\omega)$ and the weighting function is a modified transfer function that has improved high-frequency behavior.

Significantly, our methodology for designing a feed-forward filter permits the level of noise-cancellation performance to be specified a priori. (In this regard, it is quite different from conventional methodologies for feed-forward filter design. This is evident from equation (5), in which it is seen that the noise cancellation performance can be specified by specifying $G(\omega)$, consistent with stability. Since equation (5) led directly to equation (8), the achievable feed-forward noise cancellation, it is clear that the proposed technique allows the designer a means of specifying, a priori, the desired level of fixed feed-forward noise cancellation performance. It should also be noted that once $G(\omega)$ has been devised, there will be no inter-user variability in G(ω), and therefore there will be no chance of instability.

EXAMPLE

Figure 7:
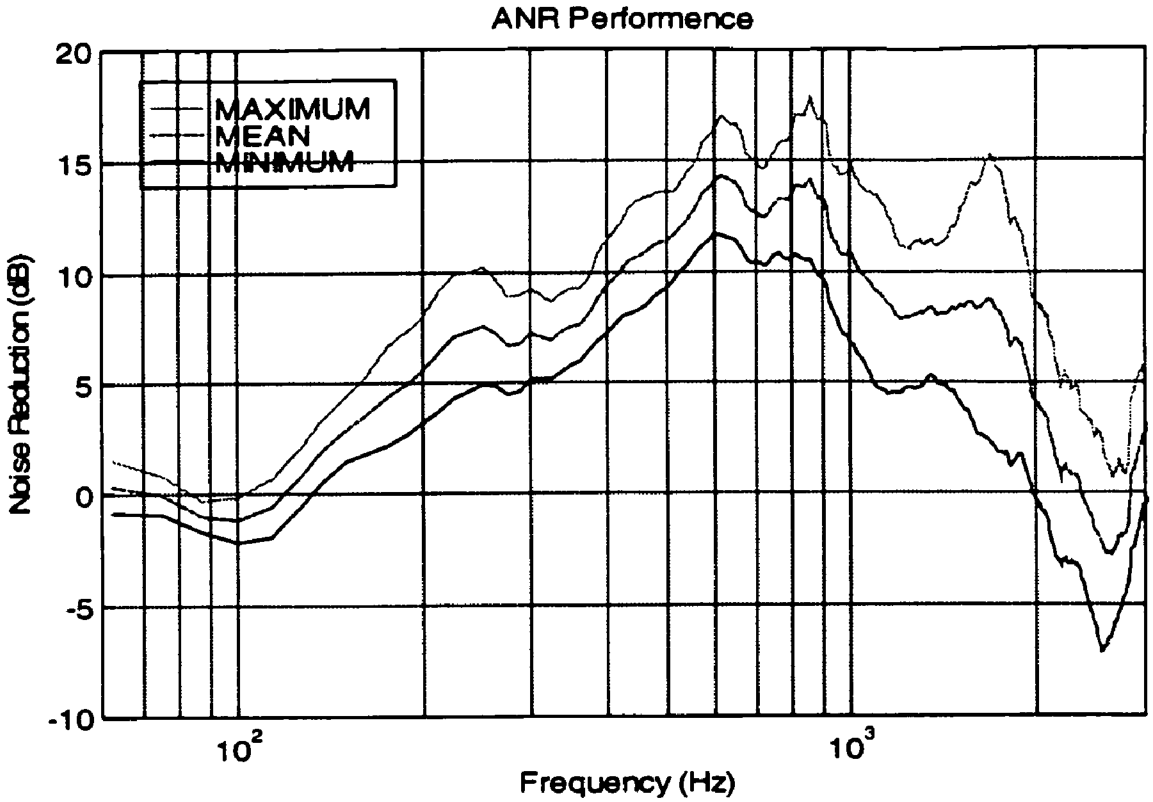
FIG. 7. shows the average noise-cancellation performance and standard deviation of a fixed feed-forward noise canceling design, according to the present invention, for five distinct users.

We made a fixed feed-forward noise cancellation system, incorporating the physical and algorithmic design principles described above. We tested our new system on a range of users. The average noise cancellation performance and standard deviation for the tested user group are shown in FIG. 7. As is evident from the figure, our system produces a peak average noise cancellation of close to 15 dB in the users' ears, with a standard deviation of about +3 dB.

In further tests, we found that when a far-end speech signal is also present, the users tend to position the earpiece of the handset in a way that tends to maximize the ratio of the far-end speech signal to the remaining noise. As mentioned above, this behavior bears some analogy to the tuning of a radio dial to maximize the signal-to-noise ratio out of the loudspeaker. In effect, by adjusting the position of the earpiece against his ear, a user is adjusting the ratio F(ω)/Y(ω) for his ear such that it is as close as possible to the optimal result for cancellation given by equation (4).

The invention claimed is:

1. A telephonic handset comprising an active noise reduction (ANR) system, wherein:

the ANR system comprises a noise reference microphone and a digital filter;

the digital filter is receivingly coupled to the noise reference microphone, and transmittingly coupled to a receiver transducing element in the handset;

the digital filter is a non-adaptive IIR filter; and the ANR system is configured as a fixed feed-forward noise-cancellation system.

2. The telephonic handset of claim 1, wherein the noise reference microphone has a port, and the port opens through an external surface of the handset that, in use, does not directly face the user's ear.

3. The telephonic handset of claim 2, wherein there is an effective distance between the port of the noise reference microphone and the receiver transducing element, and said distance is no more than 3.8 cm.

4. The telephonic handset of claim 3, wherein the effective distance is no more than 2.5 cm.

5. The telephonic handset of claim 1, wherein:

the ANR system has an operating frequency range;

the receiver transducing element has an approximate transfer function Y(ω);

when the handset is in use, a transfer function F(ω) approximately relates ambient acoustic noise pressure $n_2$ at a user's ear-canal opening to ambient acoustic noise pressure $n_1$ at the port of the noise reference microphone according to $n_2=F(\omega)n_1$; and over the operating range, the IIR filter has a transfer function given by the product of a weighting function times $$\frac{F(\omega)}{Y(\omega)}.$$

6. The telephonic handset of claim 5, wherein the weighting function rolls off above the operating frequency range.

7. The telephonic handset of claim 5, wherein:

G(ω) is a feasible open loop gain for the ANR system if it is configured as a fixed feedback system instead of a fixed feed-forward system; and over the operating range, the weighting function is $$\frac{G(\omega)}{1+G(\omega)}.$$

8. The telephonic handset of claim 5, wherein F(ω) and Y(ω) are averaged over a population of representative users.

9. A method of active noise reduction (ANR), comprising:

sampling ambient noise adjacent an external surface of a telephonic handset, thereby to provide a reference signal;

processing the reference signal in a non-adaptive IIR filter, thereby to provide a cancellation signal effective for at least partially canceling ambient noise in the vicinity of the entrance to a user's ear canal; and feeding the cancellation signal forward to a receiver transducing element substantially without feedback from said element.

10. The method of claim 9, wherein:

the receiver transducing element has an approximate transfer function Y(ω);

an approximate transfer function F(ω) relates sampled noise pressure $n_2$ to ambient noise pressure $n_1$ in the vicinity of a user's ear canal according to $n_2=F(\omega)n_1$; and the processing of the reference signal is carried out according to a filter transfer function given by the product of a weighting function times $$\frac{F(\omega)}{Y(\omega)}.$$

11. The method of claim 10, wherein the weighting function rolls off above the operating frequency range.

12. The method of claim 10, wherein:

G(ω) is a feasible open-loop gain of a fixed feedback ANR system for the handset; and the weighting function is given by $$\frac{G(\omega)}{1+G(\omega)}.$$

13. The method of claim 10, wherein F(ω) and Y(ω) are averaged over a population of representative users.

14. The method of claim 9, further comprising adjusting the position of the handset relative to the user's ear so as to achieve optimal perceived noise cancellation.

15. The method of claim 9, wherein said sampling is carried out at an external surface of the handset that does not face directly toward the user's ear.

16. The method of claim 15, wherein said sampling is carried out no more than 3.8 cm from the center of the receiver transducing element.

17. The method of claim 16, wherein said sampling is carried out no more than 2.5 cm from the center of said element.

18. The method of claim 15, further comprising adjusting the position of the handset relative to the user's ear so as to achieve optimal perceived noise cancellation.

19. A telephonic handset comprising:

a noise reference microphone configured to sample a noise field at a sampling location and to generate a noise signal in response to the noise field;

a receiver transducing element;

a non-adaptive digital IIR filter configured to process the noise signal, thereby to form a noise-cancelling signal; and circuitry configured to combine the noise-cancelling signal with a far-end speech signal and to forward the combined signals to the receiver transducing element;

wherein the IIR filter is configured in a fixed feed-forward noise-cancellation system.

* * * * *